(12) United States Patent
Kurimoto et al.

(10) Patent No.: US 8,068,839 B2
(45) Date of Patent: Nov. 29, 2011

(54) MOBILE RADIO COMMUNICATION SYSTEM, BASE STATION APPARATUS, RADIO NETWORK CONTROLLER, AND MOBILE STATION

(75) Inventors: Kenji Kurimoto, Tokyo (JP); Kuniyuki Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 994 days.

(21) Appl. No.: 11/916,822

(22) PCT Filed: Jun. 9, 2005

(86) PCT No.: PCT/JP2005/010606
§ 371 (c)(1),
(2), (4) Date: Jul. 7, 2008

(87) PCT Pub. No.: WO2006/131977
PCT Pub. Date: Dec. 14, 2006

(65) Prior Publication Data
US 2009/0137250 A1 May 28, 2009

(51) Int. Cl.
*H04W 36/00* (2009.01)
(52) U.S. Cl. ........ 455/437; 455/436; 455/439; 455/440; 455/441; 455/444; 370/331; 370/332
(58) Field of Classification Search .............. 455/437, 455/436, 439, 440, 441, 444; 370/331, 332
See application file for complete search history.

(56) References Cited

U.S. PATENT DOCUMENTS

2002/0072370 A1* 6/2002 Johansson et al. ............ 455/436
2006/0239238 A1* 10/2006 Fernandez-Corbaton et al. ............................ 370/342

FOREIGN PATENT DOCUMENTS

| JP | 10-126830 | 5/1998 |
|---|---|---|
| JP | 11/98071 | 4/1999 |
| JP | 2000-358266 | 12/2000 |
| JP | 2001-28778 | 1/2001 |
| JP | 2001-169339 | 6/2001 |
| JP | 2002-27519 | 1/2002 |
| JP | 2002-135847 | 5/2002 |
| JP | 2002-538699 | 11/2002 |
| WO | WO 99/23847 | 5/1999 |
| WO | WO 99/27657 | 6/1999 |
| WO | WO 99/62285 | 12/1999 |
| WO | WO 00/51393 | 8/2000 |
| WO | WO 00/57664 | 9/2000 |

\* cited by examiner

*Primary Examiner* — Ajit Patel
*Assistant Examiner* — Khai M Nguyen
(74) *Attorney, Agent, or Firm* — Oblon, Spivak, McClelland, Maier & Neustadt, L.L.P.

(57) ABSTRACT

In a mobile radio network in which synchronous base stations and asynchronous base stations coexist, according to handover destination base station candidate information transmitted from a base station to a mobile station, effective time information indicating either an effective time during which it is guaranteed that a signal from a base station candidate included in the handover destination base station candidate information can be detected when, after a lapse of an integral multiple of a fixed time interval from a time when the mobile station could detect a reference signal which were transmitted at the fixed time intervals from the base station candidate, the mobile station detects the same base station candidate again, the effective time depending on the base station candidate, or an index for enabling the mobile station to drive the effective time is provided to the mobile station, and the mobile station carries out the detection by setting up the detection time intervals at which the mobile station detects a signal from the base station candidate on the basis of the effective time information.

20 Claims, 5 Drawing Sheets

FIG.3

Base Station Candidate

| ID Number | Effective Time |
|---|---|
| 0001 | 100sec |
| 0002 | 200sec |
| 0003 | 50sec |
| ⋮ | ⋮ |

FIG.4

Effective Time Information

| ID Number | Base Station Type |
|---|---|
| 0001 | Network Synchronization |
| 0002 | GPS Synchronization |
| 0003 | Free Running |
| ⋮ | ⋮ |

FIG.5

Effective Time Information

| ID Number | Clock Accuracy |
|---|---|
| 0001 | 10E-9 |
| 0002 | 10E-12 |
| 0003 | 10E-10 |
| ⋮ | ⋮ |

FIG.6

Effective Time Information

| ID Number | Clock Source Identification Number |
|---|---|
| 0001 | 10000 |
| 0002 | 39453 |
| 0003 | 00854 |
| ... | ... |

FIG.7

Effective Time Information

| ID Number | GPS Synchronization Accuracy Type |
|---|---|
| 0001 | A |
| 0002 | B |
| 0003 | C |
| ... | ... |

FIG.8

Effective Time Information

| ID Number | Information |
|---|---|
| 0001 | Network Synchronization |
| 0002 | 10E-10 |
| 0003 | A |
| ... | ... |

MOBILE RADIO COMMUNICATION SYSTEM, BASE STATION APPARATUS, RADIO NETWORK CONTROLLER, AND MOBILE STATION

FIELD OF THE INVENTION

The present invention relates to a mobile radio communication system in which, in a mobile radio network in which synchronous base stations and asynchronous base stations coexist, a moving mobile station effectively performs a handover operation of changing a base station which is a communication destination, a base station apparatus, a radio network controller, and a mobile station.

BACKGROUND OF THE INVENTION

For example, in a mobile radio communication system for mobile phones, an area where an electric wave from one base station can reach are of the order of about several hundred meters to several kilometers. Therefore, when a mobile station moves from the area of a base station to the area of another base station, the mobile station performs an operation of changing the base station on the other end of the communications, i.e., a so-called handover operation. When performing this handover operation, the mobile station performs a search operation of measuring the receive level (the field strength) of the base station with which the mobile station is currently communicating and the receive level of each base station located in an adjacent area, and detects a base station whose receive level is the highest from among base stations whose receive levels have been received. As a technology for such a handover operation, a method of a mobile station measuring the reception quality of a neighboring base station, and increasing or decreasing the frequency of a searching operation according to whether or not a searching operation is newly required, thereby reducing the power consumption of the mobile station is proposed by patent reference 1.

In a mobile radio communication system which implements this conventional technology, the length of time intervals at which candidates for handover destination base station are detected is determined dependently upon the original design of mobile stations. On the other hand, because as base stations for use in a mobile radio communication system, asynchronous base stations also exist in addition to synchronous base stations, and an influence of a drift of a system clock, and so on is added to this type of base stations, it is necessary to reduce the length of time intervals at which candidates for handover destination base station are detected for asynchronous base stations as compared with that for synchronous base station. A problem is therefore that when an asynchronous base station becomes a candidate for handover destination base station, a mobile station which independently determines the detection time intervals as mentioned above, like conventional mobile stations, cannot catch the candidate for handover destination base station.

[Patent reference 1] JP, 2001-28778, A

The present invention is made in order to solve the above-mentioned problem, and it is therefore an object of the present invention to provide a mobile radio communication system which enables a mobile station to catch a candidate for handover destination base station certainly even if asynchronous base stations coexist in a mobile radio network in addition to synchronous base stations, a base station apparatus, a radio network controller, and a mobile station.

DISCLOSURE OF THE INVENTION

In accordance with the present invention, there is provided a mobile radio communication system in which a plurality of base station apparatuses communicate with at least one mobile station while they perform a handover operation, wherein each base station apparatus includes: a base station candidate information generating means for generating handover destination base station candidate information indicating base station candidates each of which can become a handover destination, the base station candidates being acquired on a basis of a position of a mobile station with which each base station apparatus in question is currently communicating or a position of each base station apparatus in question; an effective time information generating means for, when, after a lapse of an integral multiple of a fixed time interval from a time when the mobile station could detect a reference signal which were transmitted at the fixed time intervals from a base station candidate included in the handover destination base station candidate information, the mobile station detects the same base station candidate again, generating effective time information indicating either an effective time during which it is guaranteed that a signal from the base station candidate can be detected, the effective time depending on the base station candidate, or an index for enabling the mobile station to drive the effective time; and a transmitting means for transmitting the generated handover destination base station candidate information and the generated effective time information to the mobile station, and wherein the mobile station includes: a receiving means for receiving the handover destination base station candidate information and the effective time information; a base station detection control means for setting up detection time intervals at which the mobile station detects a signal from a base station candidate which can become the handover destination on a basis of the received effective time information and a movement speed thereof; and a base station detecting means for performing detection of a base station apparatus specified by the received handover destination base station candidate information at the set-up detection time intervals.

As a result, because the effective time information which varies for every base station can be associated with each candidate for handover destination base station, and the mobile station can acquire the detection time intervals required to catch each base station candidate on the basis of the effective time information, the present invention provides an advantage of being able to, even if an asynchronous base station exists in the base station candidates, enable the mobile station to capture the asynchronous base station certainly. Furthermore, the present invention offers another advantage of, by further setting the length of the detection time intervals to a maximum one with which the mobile station can catch the base station candidate, being able to reduce the power required for the mobile station to catch the base station to a minimum.

BRIEF DESCRIPTION OF THE FIGURES

FIG. 3 is an explanatory drawing showing a first example of effective time information in accordance with Embodiment 1 of the present invention;

FIG. 4 is an explanatory drawing showing a second example of effective time information in accordance with Embodiment 1 of the present invention;

FIG. 5 is an explanatory drawing showing a third example of effective time information in accordance with Embodiment 1 of the present invention;

FIG. 6 is an explanatory drawing showing a fourth example of effective time information in accordance with Embodiment 1 of the present invention;

FIG. 7 is an explanatory drawing showing a fifth example of effective time information in accordance with Embodiment 1 of the present invention;

FIG. 8 is an explanatory drawing showing an example of a combination of pieces of effective time information in accordance with Embodiment 1 of the present invention.

PREFERRED EMBODIMENTS OF THE INVENTION

Hereafter, in order to explain this invention in greater detail, the preferred embodiments of the present invention will be described with reference to the accompanying drawings.

Embodiment 1

Figure 1:
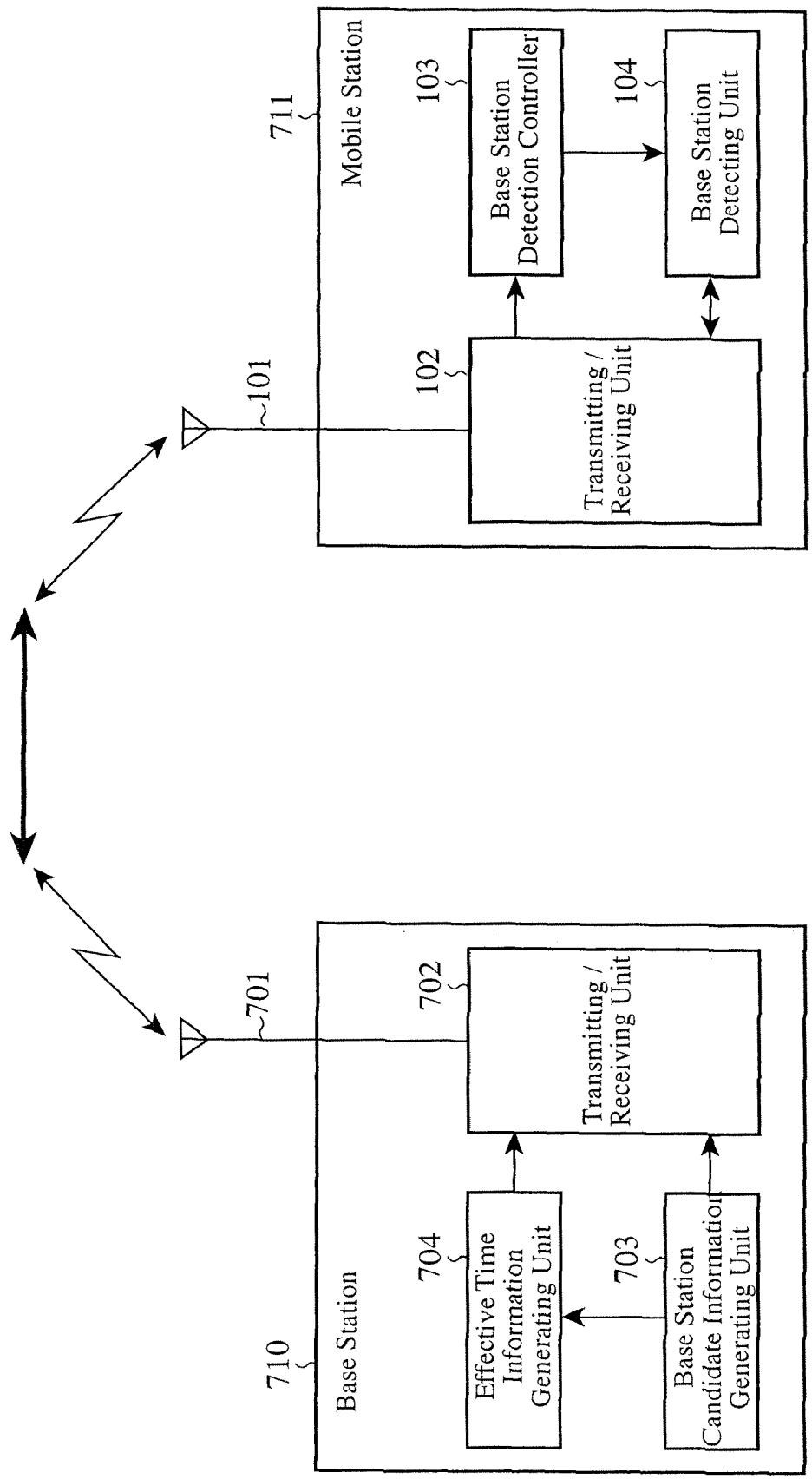
FIG. 1 is a block diagram showing the structure of a base station and the structure of a mobile station in accordance with Embodiment 1 of the present invention.

FIG. 1 is a block diagram showing the structure of a base station and the structure of a mobile station in accordance with Embodiment 1 of the present invention. In the internal structures of the base station (a base station apparatus) 710 and the mobile station (a mobile station) 711 shown in the figure, only functional units associated with a handover operation which is the target of the present invention are shown and other functional units are omitted.

The base station 710 is provided with an antenna 701, a transmitting/receiving unit 702, a base station candidate information generating unit 703, and an effective time information generating unit 704. The base station candidate information generating unit 703 is a means for generating handover destination base station candidate information indicating base station candidates each of which can become a handover destination of the mobile station 711 on the basis of either the position of the mobile station 711 with which the base station is currently communicating or the position of the base station 710. The effective time information generating unit 704 is a means for generating effective time information which is to be used in order for the mobile station 711 to set the length of detection time intervals at which the mobile station detects a signal from each base station candidate which can become the handover destination according to the handover destination base station candidate information.

On the other hand, the mobile station 711 is provided with an antenna 101, a transmitting/receiving unit 102, a base station detecting unit 103, and a base station detection controller 104. The base station detection controller 103 is a means for setting the length of detection time intervals at which the mobile station detects a signal from each base station candidate which can become the handover destination on the basis of the effective time information received by the transmitting/receiving unit 102 and the movement speed of the mobile station. The base station detecting unit 104 is a means for detecting the base station apparatuses specified by the handover destination base station candidate information at the set detection time intervals.

Figure 2:
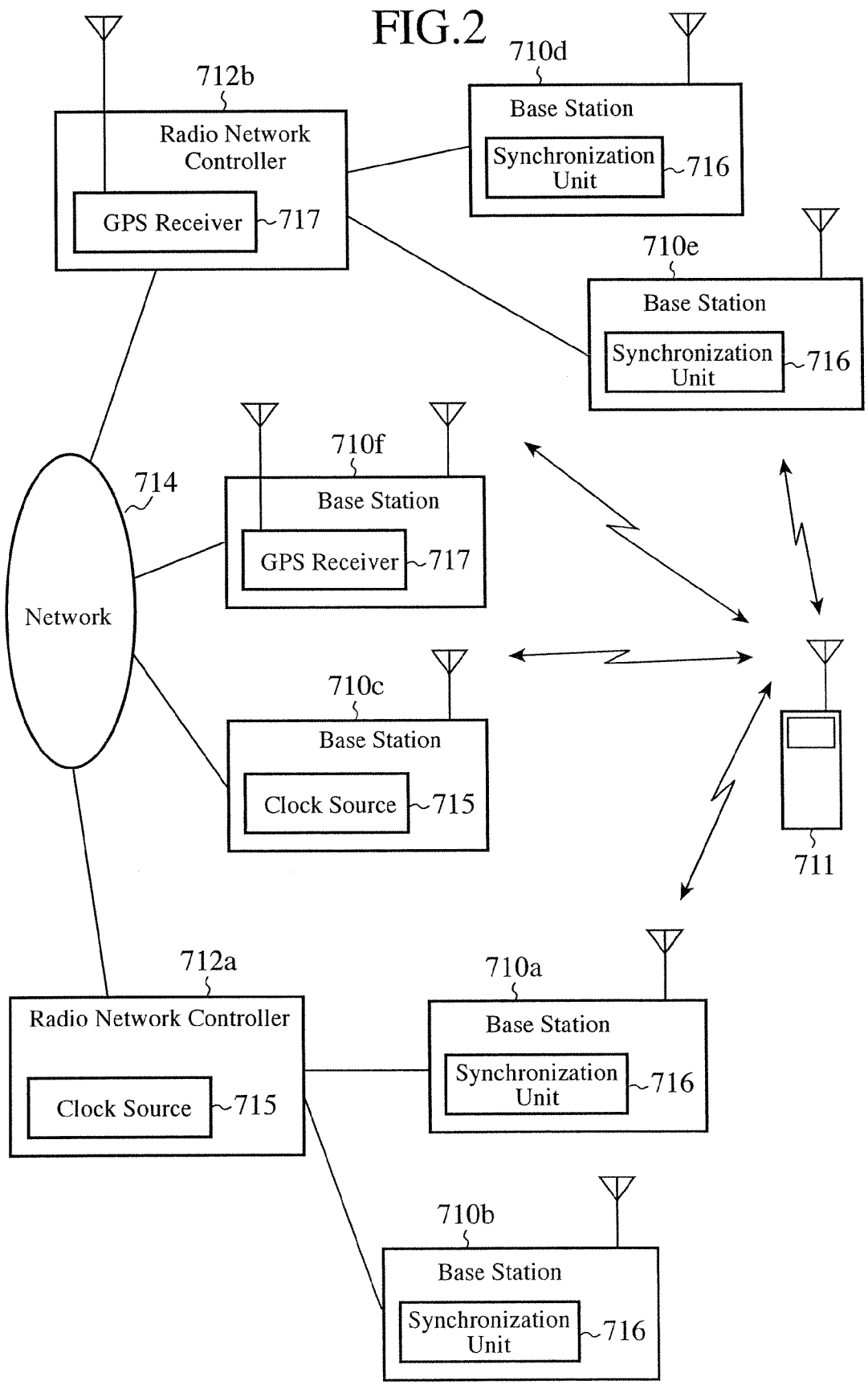
FIG. 2 is an explanatory drawing showing the structure of a mobile radio network in accordance with Embodiment 1 of the present invention.

FIG. 2 is an explanatory drawing showing an example of the configuration of the mobile radio network in which the base station 710 and the mobile station 711 shown in FIG. 1 are applied.

In the configuration of this mobile radio network, a communication network 714, radio network controllers 712a and 712b, base stations 710a, ..., and 710f, and the mobile station 711 are shown. The radio network controller 712a is provided with a clock source 715, and the base stations 710a and 710b each equipped with a synchronization unit 716 are connected to this radio network controller by way of cable transmission paths. The other radio network controller 712b is provided with a GPS (Global Positioning System) receiver, and the base stations 710d and 710e each equipped with a synchronization unit 716 are connected to this radio network controller by way of cable transmission paths. The base station 710c is provided with a clock source 715, and the base station 710f is provided with a GPS receiver. The radio network controllers 712a and 712b and the base stations 710c and 710f are connected to one another via the communication network 714.

Because each of the base stations 710a and 710b receives a reference clock from the clock source 715 of the radio network controller 712a via the cable transmission path and each synchronization unit 716 extracts and uses the reference clock and a reference timing, both of the base stations run in synchronization with the clock source 715 of the radio network controller 712a. In contrast, because each of the base stations 710d and 710e receives a GPS reference clock acquired by the GPS receiver 717 of the radio network controller 712b via the cable transmission path, and each synchronization unit 716 extracts and uses the GPS reference clock, both of the base stations run in synchronization with the GPS clock. Because the base station 710f has its own GPS receiver 717, and receives and uses the GPS reference clock, the base station runs in synchronization with the GPS clock, like the base stations 710d and 710e. Furthermore, the radio network control units 712a and 712b and the base stations 710c, 710d, 710e, and 710f exchange data with one another via the communication network 714. The mobile station 711 performs a handover operation, which will be mentioned later, of performing a handover to either of the base stations 710a, ..., and 710f, which are put in the above-mentioned relation, as the mobile station moves, and will communicate with a base station to which the mobile station could perform a handover.

Next, the operation of the handover operation of the mobile radio communication system according to the present invention will be explained with reference to FIGS. 1 and 2.

In the base station 710, when the mobile station 711 in a state of communicating with the base station is trying to perform a handover operation, the base station candidate information generating unit 703 generates handover destination base station candidate information indicating base stations which can become the handover destination. Hereafter, three examples of a method of generating the handover destination base station candidate information will be shown.

The first method is the one of storing the base station installation positions of all base stations in advance, and extracting base stations other than the target base station 711 from base stations which are located around the target base station 711 in order of increasing distance from the target base station 711 to generate a list of base stations. Concretely, information about the installation positions of all the base stations connected to this mobile radio communication system is stored in a common server (not shown) connected to the communication network. When the base station 711 informs the mobile station about the candidates for handover destination base station, the base station candidate information generating unit 703 inquires of the server about the information. The server extracts, as candidates for handover destination base station, a plurality of base stations which are located around the base station 711 on the basis of the installation position of the base station 711 which has made the inquiry and informs the base station candidate information generating unit 703 of the base station 711 about the candidates for handover destination base station, and the base station candidate information generating unit lists them as handover destination base station candidate information.

The second method further includes the steps of selecting, as candidates for handover destination base station, base stations which are close to the mobile station 711 from other base stations adjacent to the base station 710 which is currently communicating with the mobile station 711 on the basis of the position of the mobile station 711 to generate the handover destination base station candidate information, in addition to the steps of the above-mentioned first method. In a case in which, for example, the mobile station is equipped with a GPS unit, the mobile station calculates the position thereof and informs the base station about the position of the mobile station. It is known that in a case in which the mobile station does not have any means of measuring the position thereof, a plurality of base stations can measure their respective two-way communication times required for communications with the mobile station so as to perform trilateration by calculating the distance between each of the base stations and the mobile station, and, using this technique, the base station can acquire the position of the mobile station. According to this method, the candidates can be narrowed down with a higher degree of accuracy as compared with the first method.

The third method is the one of the mobile station doing it on its own. When the mobile station performs a process of searching for base station candidates which are located around the mobile station, the mobile station searches for neighboring base stations on the precondition that the neighboring base station candidates are unknown at fixed intervals. The base station acquires results of the searching and then determines base station candidates from the searching results.

The handover destination base station candidate information generated by the base station candidate information generating unit 703 is sent to both the effective time information generating unit 704 and the transmitting/receiving unit 702. The effective time information generating unit 704 generates effective time information which will be mentioned later according to this handover destination base station candidate information, and sends it to the transmitting/receiving unit 702. The transmitting/receiving unit 702 transmits this handover destination base station candidate information and the effective time information corresponding to the handover destination base station candidate information to the mobile station 711 from the antenna 701. In this embodiment, it can be considered that the base station 710 shown in FIG. 1 which is currently communicating with the mobile station 711 is either of the base stations 710a, . . . , and 710f shown in FIG. 2, and a proper number of base stations other than the base station become candidates for handover destination base station.

The mobile station 711 receives the handover destination base station candidate information and the effective time information which are transmitted from the base station 710 via the antenna 101 by using the transmitting/receiving unit 102. The received handover destination base station candidate information is inputted to the base station detecting unit 104, while the effective time information is inputted to the base station detection controller 104. The base station detection controller 104 sets the length of detection time intervals at which the mobile station detects base stations on the basis of the effective time information and the movement speed of the mobile station, and informs the base station detecting unit 103 about the length of detection time intervals. The base station detecting unit 103 measures the receive level of a known sequence with which it can identify a base station at the detection time intervals informed by the base station detection controller 104 so as to detect a signal which each handover destination base station candidate transmits. For example, according to a W-CDMA (Wideband Code Division Multiple Access; broadband time division multiple access) system, when the candidates have been already known, correlation power with a known sequence (CPICH or PSCH/SSCH) is calculated using a corresponding scrambling code. When searching for an unknown base station, the base station performs detection of the correlation power of a common PSCH first, and then calculates the correlation power of an SSCH transmitted at the same timing as that at which the PSCH is transmitted and finally calculates the correlation power of a CPICH by using a candidate for a scrambling code which is defined by a combination of sequential SSCHs. The above-mentioned correlation power is notified to the base station (or a base station control apparatus). The base station (or a base station control apparatus) issues a handover instruction to an optimal base station as needed by also taking into consideration the transmit power of the base station.

Next, various examples of the effective time information which is used by this Embodiment 1 will be explained. First, a first example of the effective time information is shown in FIG. 3.

In this case, the effective time information is comprised of ID (Identification) numbers each for identifying a base station as a candidate for handover destination base station, and effective times of the base stations respectively corresponding to those ID numbers. For example, in the case of a W-CDMA system, an ID number is associated with a scrambling code type or a relative transmission timing relative to the transmission timing of the base station with which the mobile station is communicating. An effective time mentioned above indicates a time interval during which it is guaranteed that a signal from a corresponding candidate for handover destination base station falls within a specific search window size (or a detectable time region) (detection results) when, after a lapse of an integral multiple of a fixed time interval from the time when the mobile station could detect a reference signal which were transmitted at the fixed time intervals from the base station candidate, the mobile station detects the same base station candidate again, the effective time depending on the base station apparatus. In the case of a CDMA system, this specific search window size indicates a window size in which it is examined what amount of time has a correlation before and behind the time when the correlation among the base station's specific channels sufficiently exceeds a threshold. In the case of a TDMA (Time Division Multiple Access) system, this specific search window size indicates a window size in which it is examined what amount of time has a correlation before and behind the time when the correlation among the base station's identification signals, such as a synchronous word and a color code, sufficiently exceeds a threshold. In a case in which the search window size of the mobile station is fixed, because the effective time during which a signal from the base station candidate can be detected within the search window size can be specified, it is desirable that the search window size is guaranteed to have the same value for all the mobile stations for use in the mobile radio communication system. In contrast, in a case in which the search window sizes differ for every mobile station, the search window size of the mobile station in question is notified to the base station, and the base station generates the effective time according to the search window size of the individual mobile station. In this case, the effective time shows the time in the case of the movement speed=0.

The mobile station increases or decreases the effective time generated by the base station according to the movement speed of thereof in consideration of the movement speed estimation capability thereof which is specific for every manufacturing maker, and sets the effective time as the length of the detection time intervals. As an alternative, in a case in which the base station which is communicating with the mobile station calculates the movement speed of the mobile station and then generates the effective time according to the calculated movement speed, the mobile station can set the effective time as the length of the detection time intervals. For example, there can be provided a movement speed estimation method which cannot be implemented by any mobile station, like a method of a plurality of base stations each measuring a two-way communication time required for two-way communications with the mobile station, calculating the distance between each base station and the mobile station so as to perform trilateration, and then calculating the speed of the mobile station on the basis of a temporal change in the distance. As an alternative, the mobile station can calculate the movement speed thereof and then inform the base station about the movement speed, and the base station can calculate the effective time in consideration of the movement speed. Particularly, when the mobile station is equipped with a GPS unit, the mobile station can acquire the movement speed thereof with a higher degree of precision than that calculated by the base station.

Hereafter, as examples of the effective time information, the one at a time when the movement speed=0 will be explained. A second example of the effective time information in accordance with Embodiment 1 is shown in FIG. 4.

In this case, the effective time information consists of ID numbers each for identifying a base station as a candidate for handover destination base station, and base station types corresponding to those ID numbers. Each base station type shows the type of one of the base stations 710a to 710f which are grouped according to FIG. 2. To be more specific, assuming that the base station 710a of FIG. 2 corresponds to the base station 710 which is currently communicating with the mobile station 711 of FIG. 1 and the effective time information of FIG. 4 is generated by the base station 710a, the base station types of the candidates for handover destination base station in this case include the type of the base station 710b which is in network synchronization, the type of the base stations 710d, 710e and 710f which is in GPS synchronization, and the base station 710c which is provided with a clock source and which is running freely.

The above-mentioned example shows that information about the local station is added to the list of the effective time information and this list is notified to the mobile station. Although a method of not notifying the base station type of the local station can be implemented, relative clock source information is notified to the mobile station in this case. In the example of FIG. 4, because the base station type of the local station is the free-running type in a case in which the ID number of the local station is 0003, all other base stations are assumed to be running freely by the base station which is running freely, and that the base station type which corresponds to ID number 0001 and ID number 0002 is the "free running" type is notified to the mobile station.

In a case in which the type of a candidate for handover destination base station which the mobile station has caught is specified as the network synchronization type, the mobile station judges the candidate which it has caught once to be effective unless the mobile station itself moves, and then calculates the length of the detection time intervals from the movement speed thereof which it has estimated using a movement speed estimating function thereof.

In a case in which the type of the candidate for handover destination base station which the mobile station has caught is specified as the free-running type, because the candidate for handover destination base station is generally running freely with a known degree of clock accuracy (frequency stability) which is specific for every communications system, the speed at which, in addition of the movement speed of the mobile station, the effective time deviates from the search window size by a difference between the frequency of a clock which the base station currently communicating with the mobile station uses as a reference clock and that of a clock which the candidate for handover destination base station uses as a reference clock increases. The mobile station calculates and sets up the length of the detection time intervals at which the mobile station carries out detection of the base station candidate from the movement speed which it has estimated using the movement speed estimating function thereof, and the clock accuracy of the candidate for handover destination base station.

For example, assume local station; network synchronization, handover destination base station candidate; free running 0.1 ppm, and search window size; 25 microseconds. Furthermore, assume that the wireless network is synchronized with a clock source like a high-stability rubidium clock.

In this case in which the candidate for handover destination base station is running freely with 0.1 ppm, because the timing of the search window size in which the candidate for handover destination base station can be detected shifts by 0.1 microseconds per 1 second, the effective time goes out of the region of the search window size after a lapse of 250 seconds even in the case of the movement speed=0. If the mobiles station performs a handover to the candidate for handover destination base station while the mobiles station remains in the state, because the handover destination base station performs a channel setup on the basis of the detection information of the mobile station, the handover destination base station cannot achieve synchronization with the mobile station and therefore the communications break down (i.e., the handover fails). It is therefore clear that the mobile station has to detect the candidate for handover destination base station again within 250 seconds in the case of the movement speed=0.

Furthermore, assume local station; GPS 0.05 ppm, handover destination base station candidate; free running 0.1 ppm, and search window size; 12 microseconds. Because the candidate for handover destination base station has up to 0.15 ppm of deviation in the frequency stability for the local station, and the timing in the search window in which the candidate for handover destination base station can be detected shifts by 0.15 microseconds per 1 second, the effective time goes out of the region of the search window size after a lapse of 80 seconds even in the case of the movement speed=0. It is therefore clear that the mobile station has to operate so as to detect the candidate for handover destination base station again within 80 seconds in the case of the movement speed=0.

In a case in which the communications system has a clock source which supports several degrees of clock accuracy (several degrees of frequency stability), the "free running" base station type can be further divided into free-running type a; 0.05 ppm-equivalent and free-running type b; 0.1 ppm-equivalent.

Furthermore, in a case in which the type of the candidate for handover destination base station which the mobile station has caught is specified as the GPS synchronization type, the mobile station operates basically in the same that it operates in the case in which the type of the candidate for handover destination base station which the mobile station has caught is specified as the free-running type, the mobile station calculates and sets up the length of the detection time intervals at which the mobile station carries out detection of the base station candidate from the movement speed which it has estimated using the movement speed estimating function thereof, and the GPS synchronization accuracy of the candidate for handover destination base station.

In summary of the setup of the length of the detection time intervals in the case of the effective time information of FIG. 4, which is described above, the mobile station calculates a speed (which is abbreviated as a "timing shift speed" from here on) at which the timing in the search window in which each candidate for handover destination base station can be detected shifts due to a movement of the mobile station from the movement speed thereof which the mobiles station has estimated by using the movement speed estimating function thereof. Independently upon this calculation, the mobile station derives a degree of clock accuracy which corresponds to the type (network synchronization type, free-running type, GPS synchronization type, or the like) of each candidate for handover destination base station which the mobile station acquires from the base station candidate information on the basis of a correspondence table showing a correspondence between base station types and degrees of clock accuracy which is prestored in a memory. The mobile station calculates the timing shift speed from this derived clock accuracy and the clock accuracy of the base station with which the mobile station is communicating. As an alternative, a relative degree of clock accuracy relative to that of the base station with which the mobile station is communicating can be provided, and, in this case, the mobile station calculates the timing shift speed from the relative degree of clock accuracy. The correspondence table can alternatively show a correspondence between base station types and timing shift speeds. The mobile station then adds the timing shift speed which it has acquired from the movement speed to the timing shift speed which it has calculated from the effective time information so as to acquire a timing shift speed based on both the movement speed of the mobile station and the effective time information. The mobile station sets a value which it obtains by dividing the search window size by this timing shift speed as the effective time, and sets a value equal to or less than the effective time as the length of the detection time intervals at which the mobile station detects each candidate for handover destination base station.

The third example of the effective time information in accordance with Embodiment 1 is shown in FIG. 5.

In this case, the effective time information consists of ID numbers each for identifying a base station as a candidate for handover destination base station, and degrees of clock accuracy of the base stations corresponding to those ID numbers. Each degree of clock accuracy shows the accuracy of a clock source which either a corresponding base station or a radio network controller has. To be more specific, assuming that the base station 710a of FIG. 2 corresponds to the base station 710 which is currently communicating with the mobile station 711 of FIG. 1 and the effective time information of FIG. 5 is generated by the base station 710a, the degrees of clock source accuracy of in this case include "10E-9" of accuracy of the clock source 715 which the base station 710c corresponding to the ID number "0001" which has become a candidate for handover destination base station has. As an alternative, the degrees of clock source accuracy of in this case include "10E-9" of accuracy of the clock source 715 of the radio network controller 712b.

The mobile station calculates the speed (i.e., the timing shift speed) at which the timing in the search window in which each candidate for handover destination base station can be detected shifts due to a movement of the mobile station from the movement speed thereof which the mobiles station has estimated by using the movement speed estimating function thereof. The mobile station further calculates a relative value of each handover destination base station candidate's clock accuracy relative to the clock accuracy of the base station with which the mobile station is currently communicating from the effective time information, and calculates the timing shift speed based on the clock accuracy from the relative value. The mobile station then adds the timing shift speed which it has acquired from the movement speed to the timing shift speed based on the clock accuracy so as to acquire a timing shift speed based on both the movement speed of the mobile station and the effective time information. The mobile station sets a value which it obtains by dividing the search window size by this timing shift speed as the effective time, and sets a value equal to or less than the effective time as the length of the detection time intervals at which the mobile station detects each candidate for handover destination base station.

For example, assume local station; network synchronization, handover destination base station candidate; free running at 0.1 ppm, and search window size; 25 microseconds, and the movement speed=15 m/second. Furthermore, assume that the wireless network is synchronized with a clock source like a high-stability rubidium clock. In this case in which the candidate for handover destination base station is running freely with 0.1 ppm, the timing of the search window in which the candidate for handover destination base station can be detected shifts by 0.1 microseconds per 1 second. In addition, because the mobile station generates a transmission timing from the timing of a received signal from the base station when the mobile station is moving away from the base station at the movement speed=15 m/second, the two-way transmission distance increases by 30 m during 1 second and therefore the timing in the search window shifts by 0.1 microseconds. As a result, the timing in the search window shifts in total by up to 0.2 microseconds during 1 second, and the effective time goes out of the region of the search window size after a lapse of 125 seconds. If the mobiles station performs a handover to the candidate for handover destination base station while the mobiles station remains in the state, because the handover destination base station performs a channel setup on the basis of the detection information of the mobile station, the handover destination base station cannot achieve synchronization with the mobile station and therefore the communications break down (i.e., the handover fails). Therefore, the mobile station has to perform detection of the candidate for handover destination base station again within 150 seconds.

A relative degree of accuracy which the base station which is communicating with the mobile station recognizes can be used as the clock accuracy of each candidate. For example, when the base station 710a and the mobile station 711 are currently communicating with each other, the base station 710a (or an upper layer) calculates a relative degree of clock accuracy on the basis of an absolute degree of clock accuracy and information on the clock source from the base station 710a for each of the base stations 710e, 710f, and 710c which have become candidates for handover destination base station of the mobile station 711, and informs the mobile station 711 about their relative degrees of clock accuracy as the effective time information. Other relative values of clock accuracy other than those shown in the example of FIG. 5 can be used as the effective time information.

The fourth example of the effective time information in accordance with Embodiment 1 is shown in FIG. 6.

In this case, the effective time information consists of ID numbers each for identifying a base stations as a candidate for handover destination base station, and the identification numbers of clock sources which are in network synchronization, the clock sources corresponding to those ID numbers, respectively. In this case, each identification number show a clock source identification number for identifying clock sources which a corresponding base station and a radio network controller have. To be more specific, assuming that the base station 710a of FIG. 2 corresponds to the base station 710 which is currently communicating with the mobile station 711 of FIG. 1 and the effective time information of FIG. 6 is generated by the base station 710a, the clock source identification numbers in this case include a number for identifying the clock source 715 of the base station 710c which has become a candidate for handover destination base station and the clock source 715 of the radio network controller 712a.

For example, when it is known in the system that the clock accuracy is 0.05 ppm and some candidates for handover destination base station have the same clock source identification number, the mobile station recognizes that they are in network synchronization.

The mobile station calculates the speed (i.e., the timing shift speed) at which the timing in the search window in which each candidate for handover destination base station can be detected shifts due to a movement of the mobile station from the movement speed thereof which the mobiles station has estimated by using the movement speed estimating function thereof. When the base station with which the mobile station is currently communicating and a handover destination candidate base station have the same clock source identification number, the mobile station divides the search window size by the timing shift speed to calculate the effective time, and sets it as the length of the detection time intervals at which the mobile station detects the candidate for handover destination base station. In contrast, when the clock source identification number of a handover destination base station candidate differs from that of the base station with which the mobile station is currently communicating, the mobile station considers that both the base stations are running freely with 0.05 ppm of clock accuracy, and then calculates the timing shift speed from the clock accuracy. The mobile station then adds the timing shift speed which it has acquired from the movement speed to the timing shift speed based on the clock accuracy so as to acquire a timing shift speed based on both the movement speed of the mobile station and the effective time information. The mobile station sets a value which it obtains by dividing the search window size by this timing shift speed as the effective time, and sets a value equal to or less than the effective time as the length of the detection time intervals at which the mobile station detects each candidate for handover destination base station.

The fifth example of the effective time information in accordance with Embodiment 1 is shown in FIG. 7. The effective time information in this case consists of ID numbers each for identifying a base station as a candidate for handover destination base station, and types of GPS synchronization accuracy corresponding to those ID numbers respectively. Each type of GPS synchronization accuracy shows the accuracy of a GPS receiver which either a corresponding base station or a radio network controller has, or the accuracy of the synchronization unit of a corresponding base station using GPS synchronization. To be more specific, assuming that the base station 710a of FIG. 2 corresponds to the base station 710 which is currently communicating with the mobile station 711 of FIG. 1 and the effective time information of FIG. 7 is generated by the base station 710a, the types of GPS synchronization accuracy in this case include the accuracy of the synchronization unit 716 which the base station 710e which has become a handover destination base station candidate has, the accuracy of the GPS receiver 717 of the radio network controller 712b, and the accuracy of the GPS receiver 717 which the base station 710f has. As an alternative, the types of GPS synchronization accuracy show relative degrees of accuracy of those apparatuses relative to the accuracy of the synchronization unit 716 which the base station 710d has.

The mobile station calculates the speed (i.e., the timing shift speed) at which the timing in the search window in which each candidate for handover destination base station can be detected shifts due to a movement of the mobile station from the movement speed thereof which the mobiles station has estimated by using the movement speed estimating function thereof. The mobile station also derives a timing shift speed from the GPS synchronization accuracy type of the base station with which the mobile station is currently communicating and the GPS synchronization accuracy type of each candidate for handover destination base station, which are derived from the effective time information. In this case, the mobile station prestores a correspondence table showing a correspondence between GPS synchronization accuracy types and timing shift speeds in a memory thereof, and drives the timing shift speed using this correspondence table. The mobile station then adds the timing shift speed which it has acquired from the movement speed to the timing shift speed which it has acquired from this GPS synchronization accuracy type so as to acquire a timing shift speed based on both the movement speed of the mobile station and the effective time information. The mobile station sets a value which it obtains by dividing the search window size by this acquired timing shift speed as the effective time, and sets a value equal to or less than the effective time as the length of the detection time intervals at which the mobile station detects each candidate for handover destination base station.

The first through fifth examples of the effective time information are explained above, though the effective time information can be formed so as to make a combined use of pieces of effective time information according to two or more of the examples as shown in a sixth example of FIG. 8. This 6th example is a combination of the second example, the third example, and the fifth example. More specifically, a degree of clock accuracy or GPS synchronization accuracy is assigned, as effective time information, to each base station which does not perform network synchronization among the handover destination base station candidates.

The mobile station calculates the speed (i.e., the timing shift speed) at which the timing in the search window in which each candidate for handover destination base station can be detected shifts due to a movement of the mobile station from the movement speed thereof which the mobiles station has estimated by using the movement speed estimating function thereof. The mobile station also converts the handover destination base station candidate types and the GPS synchronization types (network synchronization, free running, GPS synchronization, and so on) included in the effective time information into degrees of clock accuracy respectively corresponding to those types. In this case, the mobile station prestores a correspondence table showing a correspondence between base station types or GPS synchronization accuracy types and degrees of clock accuracy in a memory thereof, and derives the degrees of clock accuracy using this correspondence table. The mobile station calculates a timing shift speed from the clock accuracy of each candidate for handover destination base station. The mobile station then adds the timing shift speed which it has acquired from the movement speed to the timing shift speed based on the clock accuracy so as to acquire a timing shift speed based on both the movement speed of the mobile station and the effective time information. The mobile station sets a value which it obtains by dividing the search window size by this acquired timing shift speed as the effective time, and sets a value equal to or less than the effective time as the length of the detection time intervals at which the mobile station detects each candidate for handover destination base station.

As mentioned above, in accordance with embodiment 1, according to the handover destination base station candidate information transmitted from the base station 710 to the mobile station 711, effective time information indicating either an effective time during which it is guaranteed that a signal from a base station candidate included in the handover destination base station candidate information can be detected when, after a lapse of an integral multiple of a fixed time interval from a time when the mobile station could detect a reference signal which were transmitted at the fixed time intervals from the base station candidate, the mobile station detects the same base station candidate again, the effective time depending on the base station candidate, or an index for enabling the mobile station to drive the effective time is provided to the mobile station 711, and the mobile station 711 carries out the detection by setting up the detection time intervals at which the mobile station detects a signal from the base station candidate which can become a handover destination on the basis of this effective time information and the movement speed thereof. Because even if a base station candidate does not achieve synchronization with the base station 710 with which the mobile station is currently communicating, the mobile station can detect the base station candidate at the detection time intervals which it has set on the basis of the effective time information by taking into consideration of the unsynchronization, the mobile station can catch the base station candidate certainly. By further setting the length of the detection time intervals to a maximum one with which the mobile station can catch the candidate for handover destination base station, the power required for the mobile station to catch the candidate for handover destination base station can be reduced to a minimum.

Embodiment 2

Figure 9:
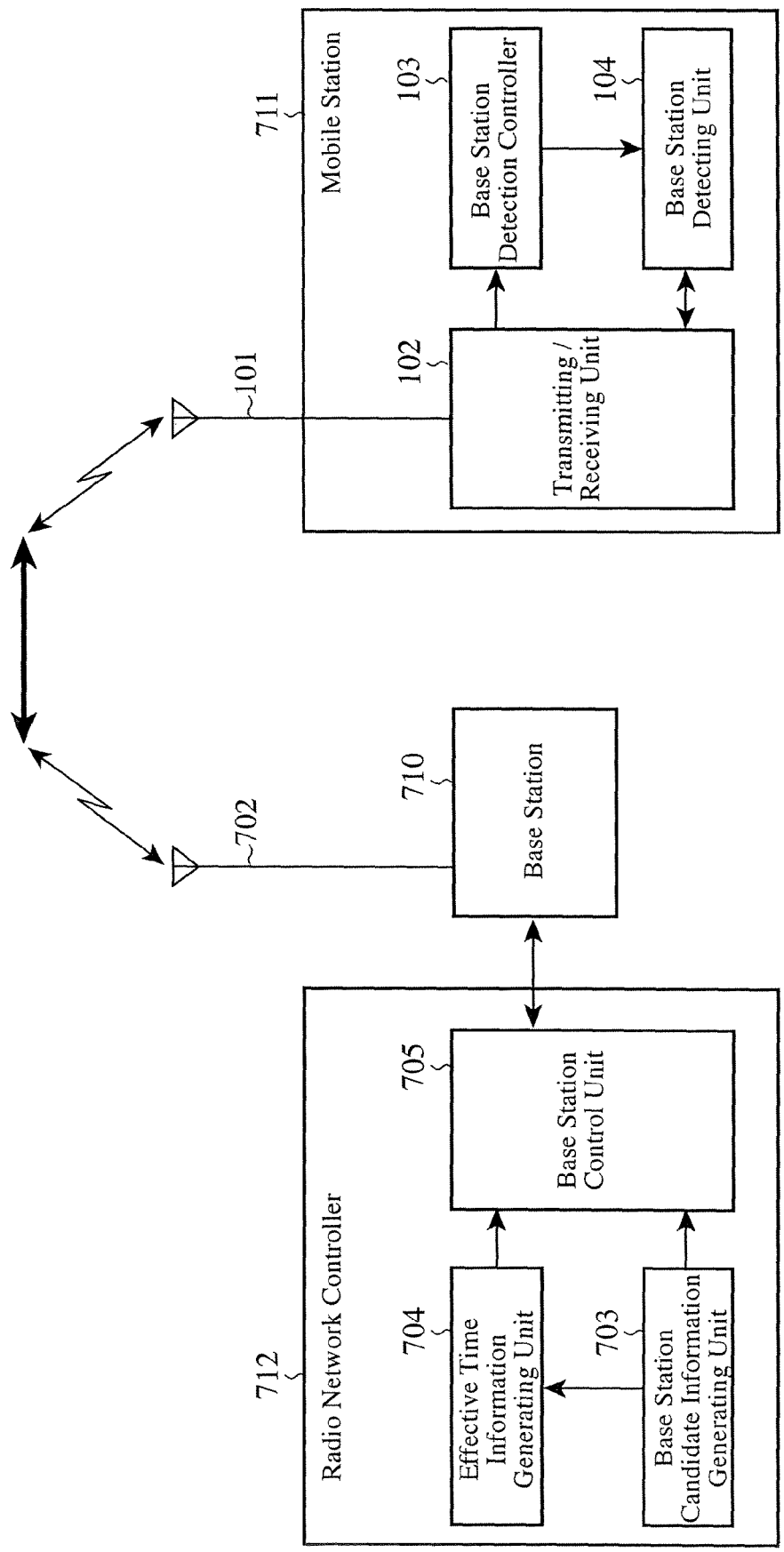
FIG. 9 is a block diagram showing the structure of a radio communications system in accordance with Embodiment 2 of the present invention.

FIG. 9 is a block diagram showing the configuration of a mobile radio communication system in accordance with Embodiment 2 of the present invention. In this mobile radio communication system, a radio network controller 712 is so constructed as to include a base station candidate information generating unit 703 and an effective time information generating unit 704 as shown in FIG. 1, in behalf of a base station 710.

The radio network controller 712 is connected to one or more base stations, and includes a base station control unit 705 which performs a handover operation or the like. The base station candidate information generating unit 703 generates handover destination base station candidate information, and sends it to both the effective time information generating unit 704 and the base station control unit 705. The effective time information generating unit 704 generates effective time information corresponding to the received handover destination base station candidate information, and sends it to the base station control unit 705. The radio base station control unit 705 sends the handover destination base station candidate information and the effective time information corresponding to the handover destination base station candidate information to the base station 710 which is currently communicating with the mobile station 711 by using a control channel (a DCCH in a W-CDMA system) or a broadcast channel which is provided for every mobile station, so as to transmit them to the mobile station 711 via the base station. The mobile station 711 which has received the handover destination base station candidate information and the effective time information operates in the same way as that mentioned in Embodiment 1 to set the length of detection time intervals from the effective time when the effective time is directly included in the effective time information or to set the length of detection time intervals by calculating the effective time on the basis of the effective time information, and to detect each candidate for handover destination base station.

As mentioned above, because in the mobile radio communication system in accordance with embodiment 2, the radio network control unit 712 which controls a plurality of base stations includes the effective time information generating unit 704 and the base station candidate information generating unit 703 in behalf of the base station 710, an advantage of being able to reduce the load on the base station 710 is provided and the same advantages as those offered by Embodiment 1 are provided.

INDUSTRIAL APPLICABILITY

As mentioned above, because the mobile radio communication system in accordance with the present invention enables a mobile station to, even if an asynchronous base station exists in base station candidates, capture the asynchronous base station certainly and then perform a handover operation, the mobile radio communication system in accordance with the present invention is effective in its application to mobile radio networks showing a tendency for various types of synchronous base stations and asynchronous base stations to coexist therein from now on.

The invention claimed is:

1. A mobile radio communication system in which a plurality of base station apparatuses communicate with at least one mobile station while they perform a handover operation, characterized in that each base station apparatus comprises:

a base station candidate information generating means for generating handover destination base station candidate information indicating base station candidates each of which can become a handover destination, the base station candidates being acquired on a basis of a position of a mobile station with which each base station apparatus in question is currently communicating or a position of each base station apparatus in question;

an effective time information generating means for, when, after a lapse of an integral multiple of a fixed time interval from a time when said mobile station could detect a reference signal which were transmitted at the fixed time intervals from a base station candidate included in said handover destination base station candidate information, said mobile station detects the same base station candidate again, generating effective time information indicating either an effective time during which it is guaranteed that a signal from said base station candidate can be detected, the effective time depending on said base station candidate, or an index for enabling said mobile station to drive said effective time; and a transmitting means for transmitting the generated handover destination base station candidate information and the generated effective time information to said mobile station, and characterized in that said mobile station comprises:

a receiving means for receiving said handover destination base station candidate information and said effective time information;

a base station detection control means for setting up detection time intervals at which the mobile station detects a signal from a base station candidate which can become the handover destination on a basis of the received effective time information and a movement speed thereof; and a base station detecting means for performing detection of a base station apparatus specified by the received handover destination base station candidate information at the set-up detection time intervals.

2. A base station apparatus for use in a mobile radio communication system in which a plurality of base station apparatuses communicate with at least one mobile station while they perform a handover operation, characterized in that said base station apparatus comprises:

a base station candidate information generating means for generating handover destination base station candidate information indicating base station candidates each of which can become a handover destination, the base station candidates being acquired on a basis of a position of a mobile station with which said base station apparatus is currently communicating or a position of said base station apparatus;

an effective time information generating means for, when, after a lapse of an integral multiple of a fixed time interval from a time when said mobile station could detect a reference signal which were transmitted at the fixed time intervals from a base station candidate included in said handover destination base station candidate information, said mobile station detects the same base station candidate again, generating effective time information indicating either an effective time during which it is guaranteed that a signal from said base station candidate can be detected, the effective time depending on said base station candidate, or an index for enabling said mobile station to drive the effective time; and a transmitting means for transmitting the generated handover destination base station candidate information and the generated effective time information to the mobile station.

3. The base station apparatus according to claim 2, characterized in that the effective time information is an index which is generated according to either whether or not the base station candidate is in network synchronization or whether or not the base station apparatus which is currently communicating with the mobile station is in network synchronization.

4. The base station apparatus according to claim 2, characterized in that the effective time information is an index which is generated according to accuracy of a clock source mounted in the base station candidate when the base station candidate is not in network synchronization.

5. The base station apparatus according to claim 2, characterized in that the effective time information is an index which is generated according to either whether or not the base station candidate includes a GPS receiver or whether or not the base station candidate is in synchronization with a network including a GPS receiver.

6. The base station apparatus according to claim 2, characterized in that the effective time information is an index which is generated according to whether or not the base station apparatus which is currently communicating with the mobile station is in network synchronization.

7. The base station apparatus according to claim 2, characterized in that the effective time information is an index which is generated according to accuracy of a clock source mounted in the base station candidate when the base station apparatus which is currently communicating with the mobile station is not in network synchronization.

8. The base station apparatus according to claim 2, characterized in that the effective time information is an index which is generated according to either whether or not the base station apparatus which is currently communicating with the mobile station includes a GPS receiver or whether or not the base station apparatus which is currently communicating with the mobile station is in synchronization with a network including a GPS receiver.

9. A radio network controller disposed in a mobile radio communication system in which a plurality of base station apparatuses communicate with at least one mobile station while they perform a handover operation, for performing control of synchronization among a certain number of base station apparatuses, characterized in that said radio network controller comprises:

a base station candidate information generating means for generating handover destination base station candidate information indicating base station candidates each of which can become a handover destination, the base station candidates being acquired on a basis of a position of a mobile station which is currently communicating with a base station apparatus on which the synchronization control is performed or a position of said base station apparatus;

an effective time information generating means for, when, after a lapse of an integral multiple of a fixed time interval from a time when said mobile station could detect a reference signal which were transmitted at the fixed time intervals from a base station candidate included in said handover destination base station candidate information, said mobile station detects the same base station candidate again, generating effective time information indicating either an effective time during which it is guaranteed that a signal from said base station candidate can be detected, the effective time depending on said base station candidate, or an index for enabling said mobile station to drive the effective time; and a base station control means for transmitting the generated handover destination base station candidate information and the generated effective time information to the mobile station via said base station apparatus which is currently communicating with the mobile station.

10. The radio network controller according to claim 9, characterized in that the effective time information is an index which is generated according to either whether or not the base station candidate is in network synchronization or whether or not the base station apparatus which is currently communicating with the mobile station is in network synchronization.

11. The radio network controller according to claim 9, characterized in that the effective time information is an index which is generated according to accuracy of a clock source mounted in the base station candidate when said base station candidate is not in network synchronization.

12. The radio network controller according to claim 9, characterized in that the effective time information is an index which is generated according to either whether or not the base station candidate includes a GPS receiver or whether or not the base station candidate is in synchronization with a network including a GPS receiver.

13. The radio network controller according to claim 9, characterized in that the effective time information is an index which is generated according to accuracy of a clock source mounted in the base station candidate when the base station apparatus which is currently communicating with the mobile station is not in network synchronization.

14. The radio network controller according to claim 9, characterized in that the effective time information is an index which is generated according to either whether or not the base station apparatus which is currently communicating with the mobile station includes a GPS receiver or whether or not the base station apparatus which is currently communicating with the mobile station is in synchronization with a network including a GPS receiver.

15. A mobile station for use in a mobile radio communication system in which a plurality of base station apparatuses communicate with at least one mobile station while they perform a handover operation, characterized in that said mobile station comprises:
  a receiving means for receiving handover destination base station candidate information and effective time information from a base station apparatus with which said mobile station is currently communicating;
  a base station detection control means for setting up detection time intervals at which a signal from a base station candidate which can become a handover destination on a basis of the received effective time information and a movement speed thereof; and
  a base station detecting means for performing detection of a base station apparatus specified by the received handover destination base station candidate information at the set-up detection time intervals,
  the handover destination base station candidate information indicating base station candidates each of which can become the handover destination, the base station candidates being acquired on a basis of a position of said mobile station or a position of said base station apparatus with which said mobile station is currently communicating, and the effective time information indicating, when, after a lapse of an integral multiple of a fixed time interval from a time when said mobile station could detect a reference signal which were transmitted at the fixed time intervals from a base station candidate included in said handover destination base station candidate information, said mobile station detects the same base station candidate again, either an effective time during which it is guaranteed that a signal from said base station candidate can be detected, the effective time depending on said base station candidate, or an index for enabling said mobile station to drive the effective time.

16. The mobile station according to claim 15, characterized in that the effective time information is an index which is generated according to either whether or not the base station candidate is in network synchronization or whether or not the base station apparatus which is currently communicating with the mobile station is in network synchronization.

17. The mobile station according to claim 15, characterized in that the effective time information is an index which is generated according to accuracy of a clock source mounted in the base station candidate when said base station candidate is not in network synchronization.

18. The mobile station according to claim 15, characterized in that the effective time information is an index which is generated according to either whether or not the base station candidate includes a GPS receiver or whether or not the base station candidate is in synchronization with a network including a GPS receiver.

19. The mobile station according to claim 15, characterized in that the effective time information is an index which is generated according to accuracy of a clock source mounted in the base station candidate when the base station apparatus which is communicating with the mobile station is not in network synchronization.

20. The mobile station according to claim 15, characterized in that the effective time information is an index which is generated according to either whether or not the base station apparatus which is currently communicating with the mobile station includes a GPS receiver or whether or not the base station apparatus which is currently communicating with the mobile station is in synchronization with a network including a GPS receiver.

* * * * *

UNITED STATES PATENT AND TRADEMARK OFFICE
CERTIFICATE OF CORRECTION

| | | |
|---|---|---|
| PATENT NO. | : 8,068,839 B2 | Page 1 of 1 |
| APPLICATION NO. | : 11/916822 | |
| DATED | : November 29, 2011 | |
| INVENTOR(S) | : Kenji Kurimoto et al. | |

It is certified that error appears in the above-identified patent and that said Letters Patent is hereby corrected as shown below:

On the title page, Item 86, change "§ 371 (c)(1), (2), (4) Date: July 7, 2008" to -- § 371 (c)(1), (2), (4) Date: December 7, 2007 --.

Signed and Sealed this
Twenty-fifth Day of September, 2012

David J. Kappos
*Director of the United States Patent and Trademark Office*